Figure 1:
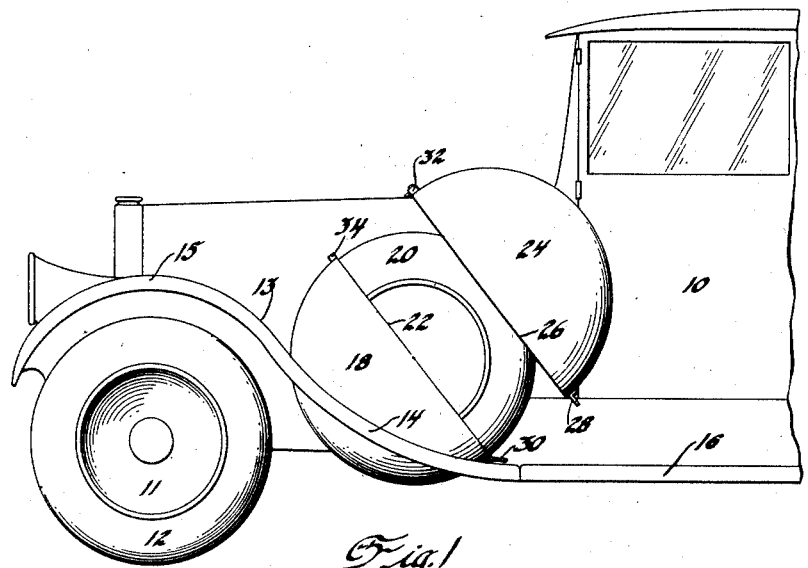

Feb. 23, 1932.   T. J. McCORMICK ET AL   1,846,134
COMBINED FENDER AND TIRE COVER
Filed Oct. 2, 1930     3 Sheets-Sheet 1

INVENTOR
Thomas J. McCormick
BY Robert E. Linn
ATTORNEY
Francis D. Hardesty

Feb. 23, 1932.    T. J. McCORMICK ET AL    1,846,134
COMBINED FENDER AND TIRE COVER
Filed Oct. 2, 1930    3 Sheets-Sheet 2

INVENTOR
Thomas J. McCormick &
BY Robert E. Linn
ATTORNEY
Francis D. Hardesty

Feb. 23, 1932. T. J. McCORMICK ET AL 1,846,134
COMBINED FENDER AND TIRE COVER
Filed Oct. 2, 1930   3 Sheets-Sheet 3

INVENTOR
Thomas J. McCormick &
BY Robert E. Linn
Francis D. Hardesty
ATTORNEY

Patented Feb. 23, 1932

1,846,134

UNITED STATES PATENT OFFICE

THOMAS J. McCORMICK AND ROBERT E. LINN, OF DETROIT, MICHIGAN; SAID LINN ASSIGNOR TO SAID McCORMICK

COMBINED FENDER AND TIRE COVER

Application filed October 2, 1930. Serial No. 485,903.

This invention relates to automobile tire covers and more particularly to covers which are built into the fenders of the automobiles, as contrasted with covers which are secured to the tires so as to form, therewith, a covered tire unit.

It has become the vogue in recent years to provide automobile fenders with wells in which there may be disposed a covered tire unit, the latter being held in place by a locked holding member secured to the body or to the fender of the vehicle. When the tire is to be applied to a wheel, it is first necessary to unlock the holding device, whereupon the covered tire unit may be lifted or rolled out of the fender well, the usual practice being to lift the unit out of the well, since rolling will cause the cover and the fender to mutually scratch and mar each other. The unit is then laid upon the ground and the cover removed, after which the tire is lifted off the ground and applied to the wheel. It will thus be seen that much lifting and handling of the tire cover ensues, a practice not at all desirable in modern times.

Further, in those cases where the wheel as a whole is changed, the unit to be handled in the manner described above, includes a heavy wheel, as well as a tire and cover, and the weights to be handled are increased many times.

Accordingly, an object of this invention is a device which will hold a bare tire or tire and wheel in place upon the fender and at the same time cover the tire or tire and wheel as the case may be, whereby when the tire or tire and wheel is removed from the fender it is ready for application to the wheel or to the hub, without further manipulation, there being no cover on the tire.

A further object is a device having the functions aforesaid and which is so constructed that a bare tire may be rolled outwardly therefrom, eliminating the necessity of lifting; rolling of a bare tire as contrasted with rolling of a covered tire, not tending to cause mutual marring of the fender and cover.

A still further object is a fender having a built-in tire container disposed on the sloping portion of the fender.

Still further objects are novel forms of tire containers adapted to be disposed in the apertured sloping portions of fenders.

Still further objects will readily occur to those skilled in the art upon reference to the following description and the accompanying drawings in which Fig. 1 shows portion of a vehicle body provided with one form of built in tire container.

Figure 2:
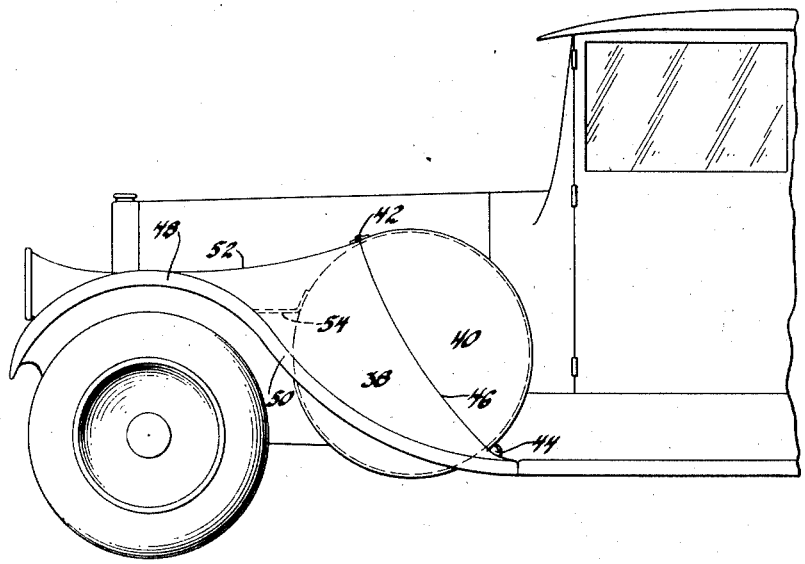

Fig. 2 shows a portion of a vehicle body provided with another form of built in tire container.

Figs. 3, 4, 5, and 6 show four other forms of containers.

Figure 6:
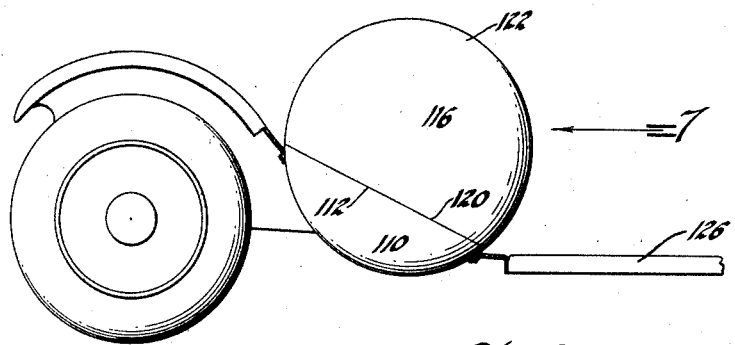
Figure 7:
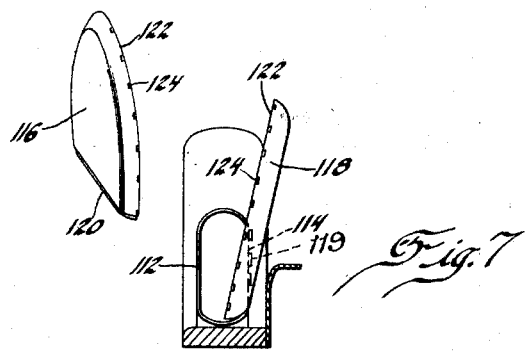

Fig. 7 shows, in disassembled relation, the parts of the form of Fig. 6, the view being in the direction of the arrow 7 of Fig. 6.

Figure 8:
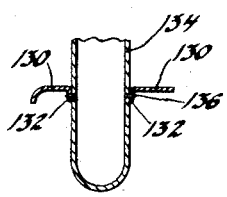
Figure 9:
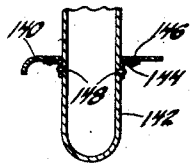
Figure 10:
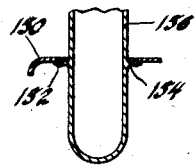

Figs. 8, 9, and 10 show three forms of connections between the fender and a portion of the container.

Referring to Fig. 1, there is shown a vehicle having a wheel at 11 provided with a tire 12 and covered and protected by the fender 13, the latter having a sloping portion 14 leading from the fender crown 15 to the running board 16, the lowest portion of the sloping portion 14 being adjacent the juncture between the fender and the running board.

The sloping portion 14 is provided with an elongated oval aperture (not shown in Fig. 1 but shown in Fig. 5) in which is disposed the receptacle 18, the latter being semi-circular in outline and being so shaped as to encompass and receive a semi-circular half of the bare uncovered tire 20.

The receptacle 18 is preferably so positioned in the fender that its diametrical line 22 forming one margin of the receptacle 18, has its lowermost terminal adjacent the lowest point of the sloping portion 14. This construction permits the tire 20 to be rolled out of the receptacle 18 and onto the running board 16 from where it can be dropped to the ground edgewise and rolled to the wheel to which a tire is to be applied.

In order to cooperate with the receptacle 18 and to form a complete tire receiving container, there is provided a second receptacle 24, substantially of the same shape as the receptacle 18, its diametrical margin 26 forming a line of juncture 22—26 with the line 22 of the receptacle 18.

Means, such as the hook 28 and the eye 30, may be provided on the receptacles to form a removable hinge connection between them, and means, such as the lock 32 and the keeper 34 may be provided to secure and lock the two receptacles 18 and 24 to each other.

In Fig. 2 the receptacles 38 and 40 are hinged to each other by the hinge 42, there being a lock means 44 whereby the receptacles may be locked to each other. Further, in this form, the line of juncture 46 between the receptacles is not exactly straight, as is the line 22—26 of Fig. 1, the line being somewhat curved as shown. It will be seen however that the fixed receptacle 38 is very little larger than a semi-circle in outline, it being that a tire could not be removed from the fixed receptacle if it were much more than 180 degrees in extent.

Fig. 2 also shows how a built-in container embodying the invention, may be streamlined so as to merge gracefully with the fender as a whole. Leading from the crown 48 of the fender 50 is a formation 52 which runs backwardly, in curved lines, to the hinge 42, the formation 52 concealing and streamlining the receptacle 38, as desired.

Further, when such streamlining is used, a shelf 54 may be disposed within the pocket formed in the formation 52, such shelf providing means upon which may be disposed tools useful in tire application, the shelf being accessible thru the receptacle 38 when the receptacle 40 is swung upwardly on its hinge 42 and the tire removed.

Figure 3:
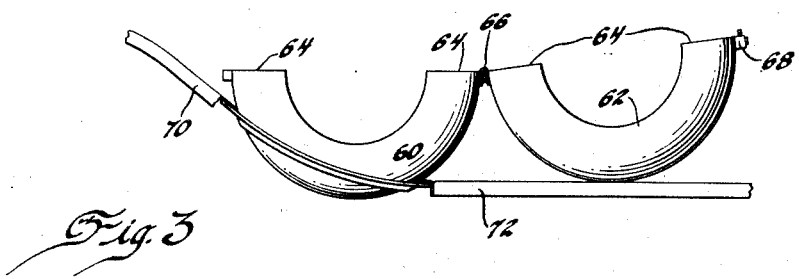

Fig. 3 shows a container which is not drum shaped as are shown to be those of Figs. 1 and 2, but is ring shaped. The container comprises two ring like receptacles 60 and 62, adapted to come together on the juncture line 64, and connected to each other by the hinge 66, there being provided a suitable locking means 68, as shown. Further, in this form, the receptacles are so positioned that the juncture line 64 does not intersect the fender 70 at the latter's lowest point, adjacent the running board 72.

Accordingly, with containers so positioned, rolling of a tire from the fixed receptacle 60 is not possible, the tire being removable only by lifting.

Figure 4:
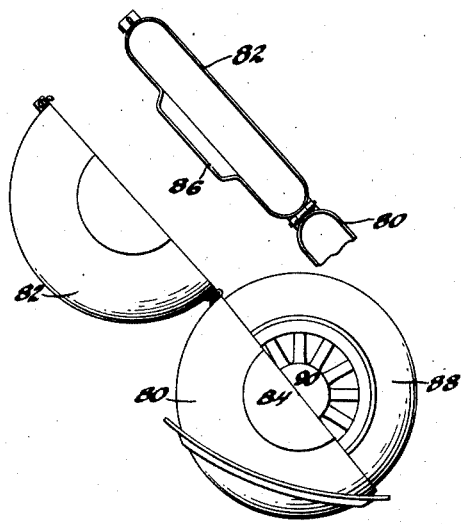

In Fig. 4, the drum type receptacles 80 and 82, are provided with raised portions 84, 86, respectively, whereby the cover may be used for a tire and wheel unit 88, having a projecting hub 90.

Figure 5:
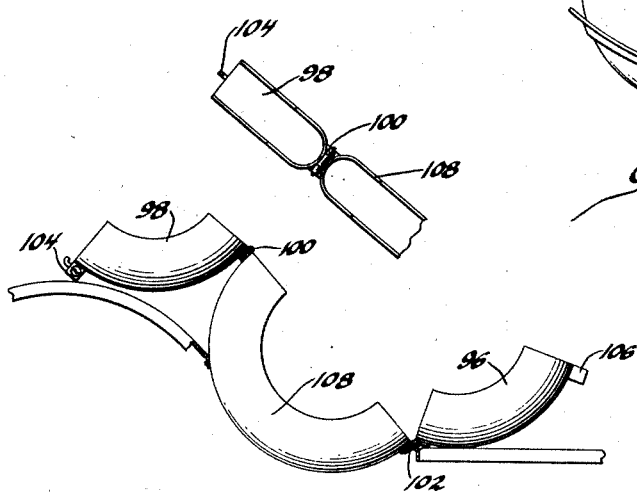

In Fig. 5, the cover forming receptacle includes two parts 96 and 98, hinged at points 100 and 102, respectively, and provided with locking parts 104 and 106, as shown. When the parts 96 and 98 are separated or swung back on their hinges, a tire contained in the fixed or containing receptacle 108 may be removed or lifted therefrom, as will be clearly understood.

In Figs. 6 and 7 there is shown a container, whose fixed receptacle 110 is a segment of about 100 degrees, the receptacle providing two alined chord-like marginal lines 112 and 114. The movable, cover-forming, receptacle includes two complementary pan-like portions 116 and 118, the portion 118 being hinged to the receptacle 110 on the line 114 and the portion 116 having a lip 120 at its lower edge adapted to cooperate with the margin 112 whereby the portion 116 may be secured to the receptacle 110. To hold parts 116 and 118 to each other, and in assembly with the fixed receptacle 110, there may be provided on the juncture line 122 suitable latching devices or deformations, such as those indicated generally, at 124, these being of the automatic type preferably.

When a tire contained within the container of Figs. 6 and 7 is to be removed, the portion 116 is first removed from the assembly, after which portion 118 may be swung backwardly on the hinge line 114, exposing an opening thru which the tire may be rolled out of the receptacle 110 and onto the running board 126.

Figs. 8, 9 and 10 show various forms of connection between the fender and the fixed receptacle. In Fig. 8, the fender 130 is provided with flanges 132 to which the receptacle 134 may be secured by means of the rivets 136. In Fig. 9 the fender 140 and the receptacle 142 are so secured to each other by the ring like angle member 144, riveted at 146 to the fender and at 148 to the receptacle. In Fig. 10 the fender 150 is secured, by rivets 152, to the ring like flange 154 cast or otherwise formed integral with the receptacle 156.

Now having described the invention and the preferred embodiment thereof, it is to be understood that the said invention is to be limited, not to the specific details herein set forth, but only by the scope of the claims which follow:

1. In combination, an automobile wheel, a fender therefor having an apertured sloping portion in back of said wheel, and a container for a tire adapted to be used with said wheel, said container including two receptacle portions, the first of which is disposed in the aperture of said fender so as to be substantially integral with the latter, and the second of which is secured to the first named receptacle, the second of said receptacles including a pan like portion hinged to a side wall edge of said first receptacle.

2. In combination, an automobile wheel, a fender therefor having an apertured sloping portion in back of said wheel, and a container for a tire adapted to be used with said wheel, said container including two receptacle portions, the first of which is disposed in the aperture of said fender so as to be substantially integral with the latter, and the second of which is secured to the first named receptacle, the second of said receptacles including a pan-like portion hinged to a side wall edge of said first named receptacle, and a second pan-like portion removably secured to the first named pan-like portion.

THOMAS J. McCORMICK.
ROBERT E. LINN.